Sept. 24, 1963 G. A. FORSTER 3,105,189

POSITIONAL DATA SYSTEM

Filed Oct. 20, 1961

INVENTOR.
George A. Forster
BY
Attorney

United States Patent Office 3,105,189
Patented Sept. 24, 1963

3,105,189
POSITIONAL DATA SYSTEM
George A. Forster, Westmont, Ill., assignor to the United States of America as represented by the United States Atomic Energy Commission
Filed Oct. 20, 1961, Ser. No. 146,668
7 Claims. (Cl. 323—52)

This invention relates generally to positional data systems for servomechanisms and more specifically to means for obtaining a direct current error signal through the use of a phase comparison position system.

Phase comparison synchro systems differ from the usual synchro system in that the stators of the master and slave synchros are excited with three phase alternating current. Since the three windings of the stator of a synchro are electrically spaced 120 degrees, a rotating magnetic field of constant magnitude is thus produced. This rotating field induces a signal in the windings of the rotor of the synchro which is constant in magnitude but which varies in phase as the mechanical position of the rotor is changed. This phase shift in electrical degrees corresponds directly to the angle of rotation of the rotor shaft in mechanical degrees. Therefore, phase sensitive means may be employed in a servomechanism whereby the phase difference between the slave synchro rotor signal and the master synchro rotor signal is utilized to initiate a direct current error signal. Said error signal then drives the servo controller and thus effects the desired response. Other devices such as phase shifters and resolvers may be used instead of synchros to achieve this same effect.

Synchros have been heretofore employed in the above manner to produce a D.C. error signal, but the signal so produced contained an objectionable A.C. noise level and required extensive filtering before the ripple factor was reduced to a tolerable level. This invention is an improvement thereon as it is capable of producing a D.C. error signal that requires only a minimum of filtering before a direct current with a low ripple factor is obtained.

The conception of the invention was the result of a need to find a force-reflecting servo system for electric manipulators that would require a minimum of leads in the cables connecting the master and slave units. A minimum of leads is highly desirable as increased flexibility in the manipulator arms results therefrom as well as increased efficiency and versatility. Phase comparison position systems have been designed that reduce the number of leads by approximately a factor of two over the usual synchro system, but these phase comparison systems have the aforementioned objectional A.C. noise level. R-C filters with high values of resistance and capacitance are required to reduce the ripple factor of such systems to a tolerable level. With these large filters, however, high response is unobtainable without instability resulting.

It is therefore an object of this invention to provide a positional data system that will increase the efficiency and flexibility of master-slave electric manipulators.

It is another object of this invention to provide a phase comparison position system capable of generating a direct current error signal with a low alternating current noise level.

It is still another object of this invention to provide means to reduce the number of leads necessary between the master and slave synchros of a complex servo system.

Other objects will become apparent as the detailed description proceeds.

In general, this invention comprises a master synchro having a rotor and a stator, a slave synchro having a rotor and a stator, a three phase alternating current power source connected to said stators, an error detector for detecting a positional difference signal that is the phasor difference between the master synchro rotor signal and the slave synchro rotor signal, a phase-shift network for shifting the phase of one of said rotor signals 90 degrees, and a demodulator responsive to said 90 degree phase shifted signal for causing said positional difference signal to shift phase 180 degrees whenever said 90 degree phase shifted signal is negative. Although the description of the device to follow refers only to the use of synchros, it is to be understood that other devices may be employed as phase shifters with equivalent results and theory of operation. This will become evident as the detailed description proceeds.

Along with the information to follow, a more complete understanding of the invention will be obtained from consideration of the accompanying drawings, in which.

Figure 1:
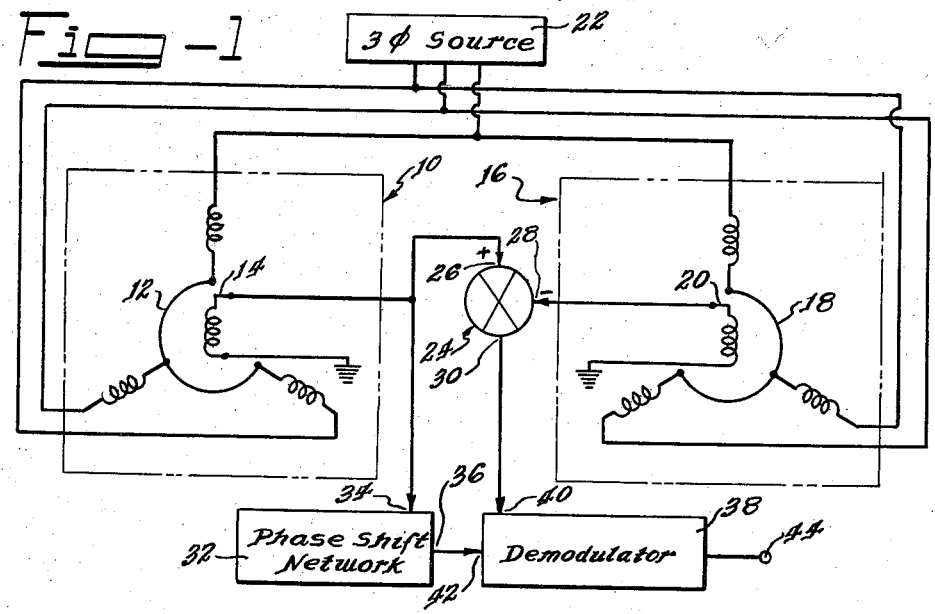
FIG. 1 is a circuit diagram of the preferred embodiment of the invention.

Referring to FIG. 1, it can be seen that the preferred embodiment employs a master synchro 10 with a stator 12 and a single winding rotor 14, and a slave synchro 16 with a stator 18 and a single winding rotor 20. The synchros are excited by a three phase, six kilocycle power source 22 connected to stators 12 and 18. An error detector 24 with a master synchro rotor signal input 26 and a slave synchro rotor signal input 28 is utilized to produce a positional difference signal at output 30. A phase shift network 32 with a master synchro rotor signal input 34 and a 90 degree phase shifted signal output 36 provides a reference signal for demodulator 38. Demodulator 38 receives said positional difference signal at input 40 and said reference signal at input 42. The demodulator then converts said difference signal into a D.C. error signal, which appears at output 44.

It is to be understood that either the master or the slave synchro rotor signal may be fed into input 34 of phase shift network 32, the master synchro rotor being shown connected into input 34 for purposes of illustration only. The details of this interchangeability will be set out later in the specification. Furthermore, depending on the components used and the operating characteristics desired, the frequency of the three phase source may be other than the stated six kilocycles.

Figure 2:
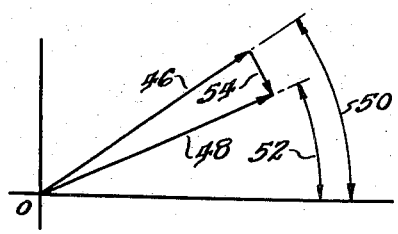
FIG. 2 is a phasor diagram showing the master synchro rotor signal, the slave synchro rotor signal, and the positional difference signal.
Figure 3:
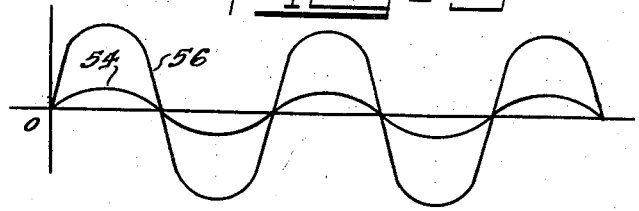
FIG. 3 is a diagram showing the waveforms appearing at the demodulator inputs.
Figure 4:
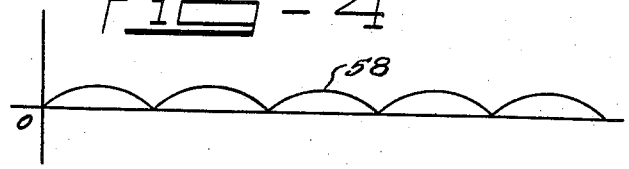
FIG. 4 is a diagram showing the D.C. error signal produced by the invention at the demodulator output.

Reference is now made to the operation of the device shown in FIG. 1, said operation being illustrated by FIGS. 2, 3, and 4. Referring to FIG. 1, it can be seen that the outputs of rotors 14 and 20 are fed into the error detector 24 at inputs 26 and 28 respectively. The signal appearing at input 26 is a sinusoidal signal which is induced in rotor 14 by the rotating magnetic field generated by stator 12. As previously explained, this rotating field is constant in magnitude and is produced by the action of the three phase current from power source 22 upon the three, 120 degree electrically spaced windings of stator 12. Thus the signal induced in rotor 14 is sinusoidal, constant in amplitude, equal in frequency to that of the three phase source 22, and variable in phase according to the angular position of the winding of rotor 14 relative to the windings of stator 12. This exact relationship also exists among stator 18, rotor 20, power source 22, and input 28.

At inputs 26 and 28, therefore, two sinusoidal signals appear that are in phase only if rotor 14 is in the same position relative to stator 12 that rotor 20 is relative to stator 18. Any deviation from said positions due to a response desired by the operator of master synchro 10 or due to an undesired change in the position of rotor 20 of slave synchro 16 will thus cause a phase difference to exist between the signals appearing at inputs 26 and 28.

Referring now to FIG. 2, the operation of the error detector is illustrated. Phasor 46 represents the signal appearing at master synchro rotor signal input 26 and phasor 48 represents the signal appearing at slave synchro rotor signal input 28. Phase angles 50 and 52 represent the phase of phasors 46 and 48 respectively. It may be seen that, for small differences between angles 50 and 52, the magnitude of closing phasor 54 will be substantially proportional to the phase difference. As discussed earlier, said phase difference in electrical degrees is equal to the difference between the rotational positions of rotors 14 and 20 in mechanical degrees. Therefore, closing phasor 54 will vary in magnitude from positive to negative depending on the amount of lead or lag of phasor 48 with respect to phasor 46. Phasor 54 may thus be utilized as a positional difference signal and appears at output 30 of error detector 24. The circuitry of error detectors are numerous and well known in the servo art, and any suitable for phasor subtraction may be used.

Reference is now made to FIG. 3 where the waveform of the aforementioned positional difference signal corresponding to closing phasor 54 is shown. Signal 56 is the master synchro rotor signal shifted 90 degrees in phase by the action of a conventional phase shift network 32 shown in FIG. 1. The master synchro rotor signal appearing at input 34 is shifted 90 degrees in phase by network 32 and appears at output 36 and hence at input 42 to demodulator 38. The difference signal 54 appears at input 40 to demodulator 38.

Since difference signal 54 represented by phasor 54 in FIG. 2 is approximately 90 degrees out of phase with the master synchro rotor signal represented by phasor 46, the 90 degree phase shifted signal 56 will be either in phase or 180 degrees out of phase with difference signal 54, depending upon the sense of difference signal 54. Thus, signal 56 is used as a reference voltage for demodulator 38. The same reasoning applies to the slave synchro rotor signal represented by phasor 48. Therefore, either rotor signal may be shifted 90 degrees in phase and used as a reference voltage for the demodulator without changing the operation of the device.

The conduction channels within said demodulator are switched in synchronism with the polarity change of signal 56 to produce a D.C. error signal 58, shown in FIG. 4 at the demodulator output 44. Error signal 58, therefore, is equivalent to difference signal 54 with its half waves reversed in polarity whenever signal 56 is negative. Hence, error signal 58 is proportional in amplitude, and corresponds in polarity, to the magnitude and direction of the difference in the angular positions of rotor 14 and rotor 20. A conventional type of phase sensitive demodulator may be used to obtain this result.

As an alternative method, the average of phasors 46 and 48 may be obtained and the signal representing said average then shifted 90 degrees in phase and used as the reference voltage for the demodulator. This would be advantageous from a theoretical standpoint, as the 90 degree phase shifted signal thus produced would be exactly in phase with difference signal 54. However, in practice the simpler embodiment discussed in the preceding paragraphs has been found to operate satisfactorily as the rapid response of the system keeps the lead or lag of the two rotor phasors small.

Since the phase difference between the master synchro rotor signal and the slave synchro rotor signal will be small in responsive servo systems, the positional difference signal and hence the D.C. error signal will necessarily be small in magnitude. Therefore, in most servo systems it will be necessary to either amplify the positional difference signal before it enters the demodulator or amplify the D.C. error signal in the controller component of the system. Furthermore, since the error signal contains an A.C. noise component, filtering of the error signal may be desirable for some applications. It may be seen from FIG. 4, however, that the waveform of the error signal is essentially the same as would be obtained from the output of a full-wave rectifier. Therefore, simple R-C filter networks using comparatively small values of resistance and capacitance will convert the signal to a substantially pure direct current.

It may be noted that the invention will operate in a manner equivalent to that described above if, for example, phase shifters or resolvers having rotors containing a single winding and stators containing two windings spaced 90 degrees apart electrically are employed in place of the synchros. Then, of course, two phase alternating current would be supplied to the stators. Furthermore, a device having a rotor with a polyphase winding and a stator with a single phase winding could be used by supplying said rotor with polyphase A.C. corresponding to said polyphase winding and connecting the stator output to the appropriate error detector input.

In summary, this invention is an improvement in phase comparison position systems and has the following attributes:

(1) When the system is at the null, i.e., the rotors of the master and slave synchros are at the same position, no A.C. noise is present in the output.

(2) The D.C. error signal may be easily filtered to obtain a pure direct current.

(3) The stators of the master and slave synchros may be excited with unbalanced three phase alternating current without impairing the performance of the system.

(4) Fewer leads are required between the master and slave synchros than in conventional synchro systems.

Persons skilled in the art will, of course, readily adapt the general teachings of the invention to embodiments other than the specific embodiment illustrated. Accordingly, the scope of the protection afforded the invention is not intended to be limited to the particular embodiment shown in the drawings and described above, but should be determined only in accordance with the appended claims.

What is claimed is:

1. Apparatus for producing a direct current error signal comprising a first device having a single phase winding and an associated polyphase winding, one of said windings being wound on a rotor and the other on a stator, a second device having a single phase winding and an associated polyphase winding, one of the windings of said second device being wound on a rotor and the other on a stator, means for exciting the polyphase windings of said first and second devices with a polyphase alternating current, means for obtaining the phasor difference between the output signals of the single phase windings of said first and second devices, means for shifting the phase of one of said output signals 90 degrees, and means responsive to said 90 degree phase shifted signal for causing half waves in the output of said phasor difference obtaining means to reverse polarity whenever said 90 degree phase shifted signal is negative.

2. Apparatus according to claim 1, wherein said means responsive to said 90 degree phase shifted signal comprises a demodulator.

3. Apparatus for producing a direct current error signal comprising a first device having a single phase winding and an associated polyphase winding, one of said windings being wound on a rotor and the other on a stator; a second device having a single phase winding and an associated polyphase winding, one of said windings being wound on a rotor and the other on a stator; means for exciting the polyphase windings of said first and second devices with a polyphase alternating current; an error detector having a first input connected to said single phase winding of said first device and a second input connected to said single phase winding of said second device; a 90 degree phase shift network having an input connected to one of said single phase windings; and a demodulator having a signal input connected to the output of said error detector, a reference input connected to the output of said 90 degree phase shift network and an output from which is obtained said direct current error signal.

4. Apparatus for producing a direct current error signal comprising a first device having a single phase winding and an associated polyphase winding, one of said windings being wound on a rotor and the other on a stator, a second device having a single phase winding and an associated polyphase winding, one of the windings of said second device being wound on a rotor and the other on a stator, means for exciting the polyphase windings of said first and second devices with a polyphase alternating current, means for obtaining the phasor difference between the output signals of the single phase windings of said first and second devices, means for shifting the phase of one of said output signals 90 degrees, and demodulating means responsive to said 90 degree phase shifted signal and to the output signal of said phasor difference obtaining means for providing a D.C. output signal whose amplitude is proportional to the A.C. amplitude of said phasor difference signal and whose polarity is dependent upon whether said 90 degree phase shifted signal is in phase or 180 degrees out of phase with said phasor difference signal, whereby said D.C. output signal is proportional in magnitude, and corresponds in polarity, to the difference in the angular positions of the rotors of said first and second devices.

5. Apparatus for producing a direct current error signal comprising a first synchro having a single phase rotor winding and a three phase stator winding, a second synchro having a single phase rotor winding and a three phase stator winding, a three phase alternating current power source connected to said stator windings, means for obtaining the phasor difference between the output signals of the rotor windings of said first and second synchros, means for shifting the phase of one of said rotor winding signals 90 degrees, and means responsive to said 90 degree phase shifted signal for causing half waves in the output of said phasor difference obtaining means to reverse polarity whenever said 90 degree phase shifted signal is negative.

6. Apparatus for producing a direct current error signal comprising a first synchro having a single phase rotor winding and a three phase stator winding; a second synchro having a single phase rotor winding and a three phase stator winding; a three phase alternating current power source connected to said stator windings; an error detector having a first input connected to said rotor winding of said first synchro and a second input connected to said rotor winding of said second synchro; a 90 degree phase shift network having an input connected to one of said rotor windings; and a demodulator having a signal input connected to the output of said error detector, a reference input connected to the output of said 90 degree phase shift network, and an output from which is obtained said direct current error signal.

7. Apparatus for producing a direct current error signal comprising a first syncho having a single phase rotor winding and a three phase stator winding, a second synchro having a single phase rotor winding and a three phase stator winding, a three phase alternating current power source connected to said stator windings, means for obtaining the phasor difference between the output signals of the rotor windings of said first and second synchros, means for shifting the phase of one of said rotor winding signals 90 degrees, and demodulating means responsive to said 90 degree phase shifted signal and to the output signal of said phasor difference obtaining means for providing a D.C. output signal whose amplitude is proportional to the A.C. amplitude of said phasor difference signal and whose polarity is dependent upon whether said 90 degree phase shifted signal is in phase or 180 degrees out of phase with said phasor difference signal, whereby said D.C. output signal is proportional in magnitude, and corresponds in polarity, to the difference in the angular positions of said first and second synchro rotors.

References Cited in the file of this patent
UNITED STATES PATENTS
2,634,387    Mercier _____ Apr. 7, 1953